(12) United States Patent
Sawai

(10) Patent No.: US 6,475,676 B1
(45) Date of Patent: Nov. 5, 2002

(54) LEAD ACID BATTERY

(75) Inventor: Ken Sawai, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 0 days.

(21) Appl. No.: 09/173,684

(22) Filed: Oct. 16, 1998

(30) Foreign Application Priority Data

Oct. 17, 1997 (JP) .............................................. 9-303752

(51) Int. Cl.[7] .................................................. H01M 2/16
(52) U.S. Cl. ........................ 429/255; 429/248; 429/249
(58) Field of Search ................................. 429/247, 248, 429/249, 255

(56) References Cited

U.S. PATENT DOCUMENTS

| | | | |
|---|---|---|---|
| 524,843 A | * | 8/1894 | Silvey |
| 2,845,469 A | * | 7/1958 | Tiegel |
| 2,882,331 A | * | 4/1959 | Zenczak |
| 4,134,192 A | * | 1/1979 | Parkinson et al. ................ 29/2 |
| 4,524,509 A | * | 6/1985 | Wegner ...................... 29/623.5 |
| 4,906,540 A | * | 3/1990 | Hoshihara et al. .......... 429/242 |
| 4,925,746 A | * | 5/1990 | Dechkov et al. .............. 429/57 |
| 5,128,218 A | * | 7/1992 | Tokunaga et al. ............. 429/57 |
| 5,512,065 A | * | 4/1996 | Kump et al. ................ 29/623.1 |

FOREIGN PATENT DOCUMENTS

| | | | |
|---|---|---|---|
| DE | 33 03 142 A | 8/1984 | |
| EP | 0 443 451 A1 | 8/1991 | |
| JP | 02 273461 | 11/1990 | |
| JP | 08007869 A | * 1/1996 | .......... H01M/02/16 |
| WO | WO 97 38457 | 10/1997 | |

OTHER PUBLICATIONS

Patent Abstracts of Japan, vol. 095, No. 001, Feb. 28, 1995 and Chemical Abstracts, vol. 122, No. 8, Feb. 20, 1995.
Chemical Abstracts, vol. 114, No. 26, Jul. 1, 1991 and Patent Abstracts of Japan, vol. 15, No. 36, Jan. 29, 1991.
Patent Abstracts of Japan, vol. 095, No. 001, Feb. 28, 1995.
Patent Abstracts of Japan, vol. 013, No. 343 (E–796), Aug. 2, 1989.
Database WPI, Section Ch, Week 9851, Derwent Publications Ltd., London, GB; Class L03, AN 98–600291.

* cited by examiner

Primary Examiner—Carol Chaney
(74) Attorney, Agent, or Firm—Sughrue Mion, PLLC

(57) ABSTRACT

A lead acid battery has a positive plate containing antimony, a negative plate; and a separator containing an organic compound capable of capturing metal ions. The organic compound is preferably lignin.

14 Claims, 5 Drawing Sheets

LEAD ACID BATTERY

BACKGROUND OF THE INVENTION

1. Field of the Invention

The present invention relates to improvement of a lead acid battery.

2. Description of the Related Art

In a conventional liquid lead acid battery, a lead-antimony alloy grid is used as a positive electrode grid. If antimony is contained in a positive plate, however, antimony is eluted from a positive electrode grid body during charge/discharge operation. The eluted antimony moves in electrolyte, and precipitates on a negative plate to thereby reduce hydrogen overvoltage. Accordingly, the yield of hydrogen due to water decomposition increases, so that the water loss characteristic is lowered. Therefore, in some lead acid batteries, a lead-calcium alloy is used for a grid body. However, when charge and discharge cycles including deep discharge are performed with a lead-calcium alloy, a lead sulfate which is a dense insulator is generated in the interface between the grid and active materials during discharge, so that the capacity is reduced in early stages, or the connection among lead dioxide particles which are active materials is reduced, so that the active materials become easy to come off. In addition, in comparison with a lead-antimony alloy, a lead-calcium alloy is so soft that shortcircuit may be caused easily by extension of the grid.

If antimony is added to the positive plate, the connection strength among lead dioxide particles is increased. Therefore, there is no fear of reduction of the capacity in early stages or coming-off of the active materials. Further, if a lead-antimony alloy is used for the positive grid body, a corrosion layer generated in the interface between the grid and the active materials is made porous, and shortcircuit due to extension of the grid is hardly generated.

In addition, a retainer type battery which is one of valve-regulated lead acid batteries of such a type that oxygen gas generated during charge is absorbed in a negative electrode is configured such that a mat-like separator made from fine fibers (for example, a glass separator) is inserted between a positive plate and a negative plate for retaining sulfuric acid electrolyte required for discharge, and for separating both electrodes from each other.

If antimony is added to a positive plate, the hydrogen overvoltage of a negative plate is reduced by the same reason as mentioned above, so that the yield of hydrogen by water decomposition increases. As a result, fatal dry-up occurs to make the battery dead. Therefore, in the conventional retainer valve-regulated lead acid battery, a lead-calcium alloy is used for the positive electrode grid, and antimony is not contained in the positive plate.

Therefore, a lead-calcium alloy is used for a grid body in retainer batteries. However, for the same reason as mentioned above, in such retainer batteries, there are problems that the cycle endurance is short, and shortcircuit is caused easily.

If antimony is added to a positive plate, for example, by using a lead-antimony alloy for the positive electrode grid, and if antimony can be prevented from moving from the positive electrode to the negative electrode, it is possible to manufacture lead acid batteries superior in the cycle life performance.

SUMMARY OF THE INVENTION

It is an object of the present invention to provide a lead acid battery which is superior in the charge and discharge cycle endurance.

According to a first aspect of the present invention, antimony is contained in a positive plate, and an organic matter capable of capturing metal ions is contained in a separator between the positive plate and a negative plate.

According to a second aspect of the present invention, in the lead acid battery according to the first aspect, the organic compound is lignin.

According to a third aspect of the present invention, in the lead acid battery according to the second aspect, the lignin contained in the separator is thiolignin.

According to a fourth aspect of the present invention, in the lead acid battery according to the second aspect, the average particle size of the lignin contained in the separator is not larger than 10 $\mu$m according to SEM observation. Further, the particle size of the lignin contained in the separator is not less than 0.05 $\mu$m. Such a small particle lignin having a particle size less than 0.05 $\mu$m is difficult to manufacture and is hard to be held by a separator. Accordingly, such a small particle lignin is not applied for a practical use.

According to a fifth aspect of the present invention, in the lead acid battery according to the second aspect, the BET specific surface of the lignin contained in the separator is not smaller than 2.5 $m^2/g$. In this case, the BET specific surface of the lignin contained in the separator is not larger than 500 $m^2/g$.

According to a sixth aspect of the present invention, in the lead acid battery according to the second aspect, the lignin contained in the separator is contained in a condition that the lignin is carried by granular silica.

According to a seventh aspect of the present invention, in the lead acid battery according to the first aspect, the lead acid battery is a retainer-type valve-regulated lead acid battery in which electrolyte is held in a mat-like separator, and oxygen gas generated in a positive electrode during charging is absorbed in a negative electrode; and antimony in a range of 50 ppm to 8,000 ppm is contained in the positive plate.

According to an eighth aspect of the present invention, in the lead acid battery according to the seventh aspect, antimony in a range of from 0.5% to 1.7% is contained in a positive electrode grid alloy.

According to a ninth aspect of the present invention, in the lead acid battery according to the seventh aspect, the separator has a multi-layer structure of not less than two layers, lignin is contained in at least one of the separator layers which are not in contact with the positive plate, the lignin content in the at least one separator layer being largest among the lignin contents in all the separator layers.

According to a tenth aspect of the present invention, in the lead acid battery according to the ninth aspect, the lignin content in the separator layer which is not in contact with the positive plate or a negative plate is largest among the lignin contents in all the separator layers.

Since antimony is contained in the positive plate, it is possible to prevent early-stage capacity reduction of the positive plate, coming-off of the active materials, and extension of the grid. If the material for capturing antimony ions is contained in a separator layer between the positive and negative plates, antimony can be captured in the separator layer. Therefore the increase of water decomposition can be prevented as mentioned above. Accordingly, features of maintenance free and water supply free can be given to the battery in the same manner as a lead acid battery containing no antimony in a positive plate. It was found that there was a large effect to prevent antimony from moving from the positive electrode to the negative electrode when lignin was contained, as the antimony ion capturing materials, between the positive and negative electrodes. In addition, it was found that a larger effect to capture antimony ions could be obtained when the contained lignin was, for example, made fine in its particle size, or carried by granular silica, so that the specific surface was made larger. Further, if the separator between the positive and negative electrodes is designed to have a multi-layer structure of two or more layers and if one of the separator layers which is in contact with the positive plate contains lignin the content of which is smaller than that in other separator layers, it is possible to restrain a bad influence due to decomposition of lignin in the positive plate during charging the battery. In addition, if the content of lignin in the separator layer which is in contact with the negative plate is made smaller than that in other separator layers, it is possible to restrain a bad influence such as deterioration of charge acceptance of the negative plate due to an excessive amount of lignin around the negative plate.

DETAILED DESCRIPTION OF THE INVENTION

Detailed description of the present invention will be described as follows accompanying with drawings.

Although commercial thiolignin and its products were used as lignin to be contained in a separator in the following embodiment, similar effects were observed when other kinds of lignin were used as the lignin to be contained in the separator. In addition, similar effects could be obtained even in the case where, other than lignin, ion-exchange resins, commercial heavy metal treatments, etc. were used. On the other hand, as for the liquid retaining type of the battery, similar effects were observed in case of any one of the types, such as a liquid type, a retainer type, a gel type, a granular silica type, etc. In addition, according to the present invention, so long as it was a retainer lead acid battery in which antimony was contained in a positive plate, and a glass mat was used for an electrolyte retainer, similar effects could be obtained even in the case of using any method of antimony addition, such as antimony addition by using a lead-antimony alloy grid, by surface treatment of a lead-calcium alloy grid, by application of lead-antimony foil, by addition of antimony to active materials, etc. In addition, as for the material of the separator, similar effects could be recognized even in the case of using any materials, such as glass fibers, resin fibers, other mixed products of plural kinds of materials, etc. In addition, similar effects, that is, the performance that the amount of liquid reduction could be reduced and the endurance could be prolonged, could be recognized regardless of the shape of the separator, or the thickness or shape of fibers themselves, or further in the case of using any method of adding lignin, such as mixing, spraying of suspension and dipping.

Figure 1A:
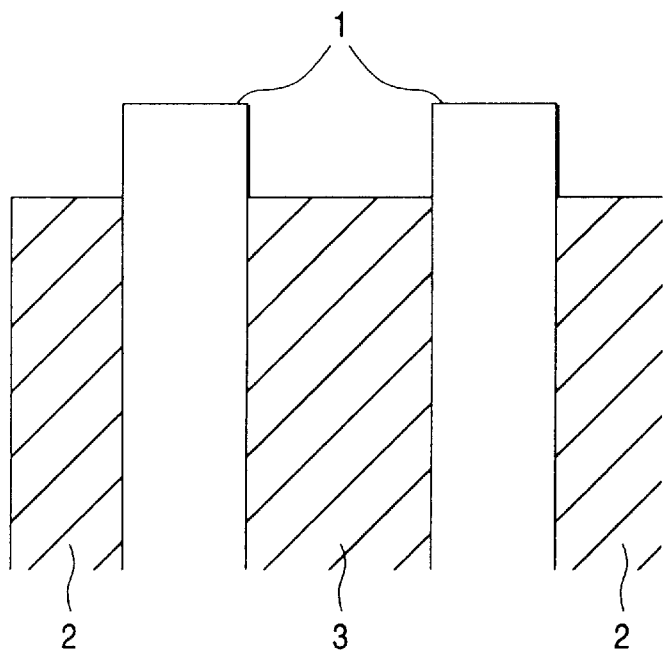
FIG. 1A is a diagram showing a sectional view between electrodes of a conventional retainer battery.
Figure 1B:
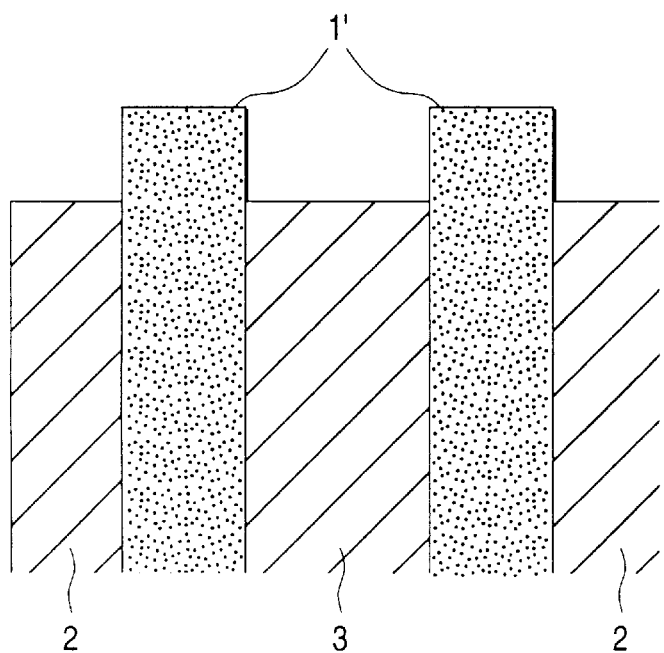
FIG. 1B is a diagram showing a sectional view between electrodes of an embodiment according to the present invention.
Figure 2:
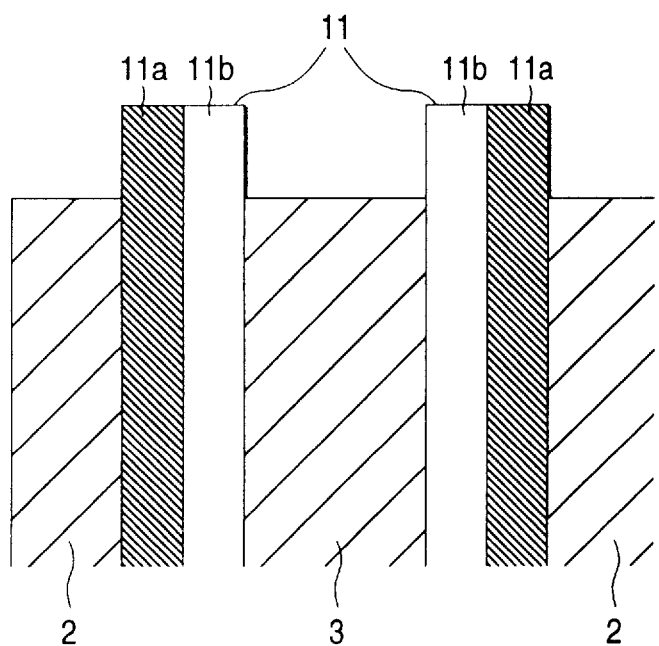
FIG. 2 is a diagram showing a sectional view between electrodes of another embodiment according to the present invention, in which a separator is constituted by two layers.
Figure 3:
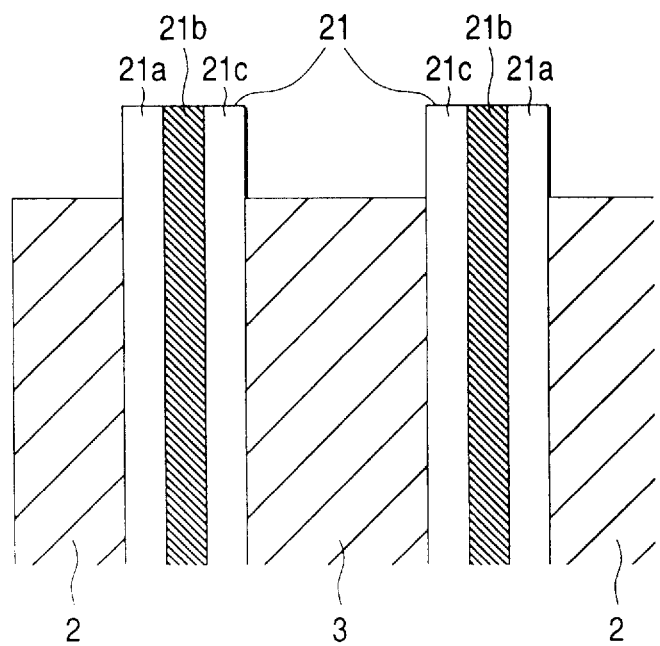
FIG. 3 is a diagram showing a sectional view between electrodes of still another embodiment according to the present invention, in which a separator is constituted by three layers.

FIG. 1A is a sectional view of a conventional retainer lead acid battery, and FIGS. 1B, 2 and 3 are sectional views between positive and negative electrodes of embodiments of the products according to the present invention. In FIG. 1, reference numeral 1 represents a single-layer separator; 2, a negative plate and 3, positive plate.

In FIG. 1B, the negative plate 2 and the positive plate 3 are similar to FIG. 1A. However, a separator is a single layer separator containing lignin. In FIG. 2, the negative plate 2 and the positive plate 3 are similar to FIG. 1A. However, a separator is a two-layer separator 11. The two-layer separator 11 consists of a first layer 11a containing lignin which is in contact with the negative layer 11a and a second layer 11b containing no lignin which is in contact with the positive plate. Incidentally, in FIG. 2, the first layer containing lignin is provided to contact with the negative plate 2. However, it is possible to change the position of the first layer 11a and the second layer 11b so that a layer containing lignin is in contact with the positive plate 3. In FIG. 3, the negative plate 2 and the positive plate 3 are similar to FIG. 1A. However, a separator is a three-layer separator 21. The three-layer separator 21 consists off a first layer 21a containing no lignin which is in contact with the negative layer 2, a third layer 21c containing lignin which is in contact with the positive layer 3, and a second layer 21b containing lignin which is provided between the first layer 21a and third layer 21c.

Similar effects could be recognized regardless of the number of separator layers between the positive and negative electrodes, even in the case of a single layer. In addition, even if the lignin content in any one of the separator layers was increased, a similar effect to capture antimony could be obtained so long as the kind of lignin was identical and so long as the total amount of lignin contained between the electrodes was identical. However, when a larger amount of lignin was contained in a separator layer contacting with the positive electrode or the negative electrode, corrosion of a positive electrode grid or deterioration of charge acceptability was recognized.

The present invention will be described in detail.

EXAMPLE

Example 1

To make a comparison, a retainer battery having a rated capacity of 60 Ah (3 hR) was prepared as shown in Table 1 by using 10 positive plates of 2.3 mm thickness with a lead—1.7% antimony alloy as a positive electrode grid alloy; 11 negative plates of 1.7 mm thickness; and fine glass fiber separators as electrolyte retainers. The total amount of antimony in the positive plates was 8,000 ppm.

TABLE 1

| Battery | positive electrode grid alloy | separator | remarks |
|---|---|---|---|
| A | lead-antimony alloy (1.7% Sb) | lignin mixed | FIG. 1B |
| B | as above | conventional | |
| C | lead-calcium alloy | conventional | |

Figure 4:
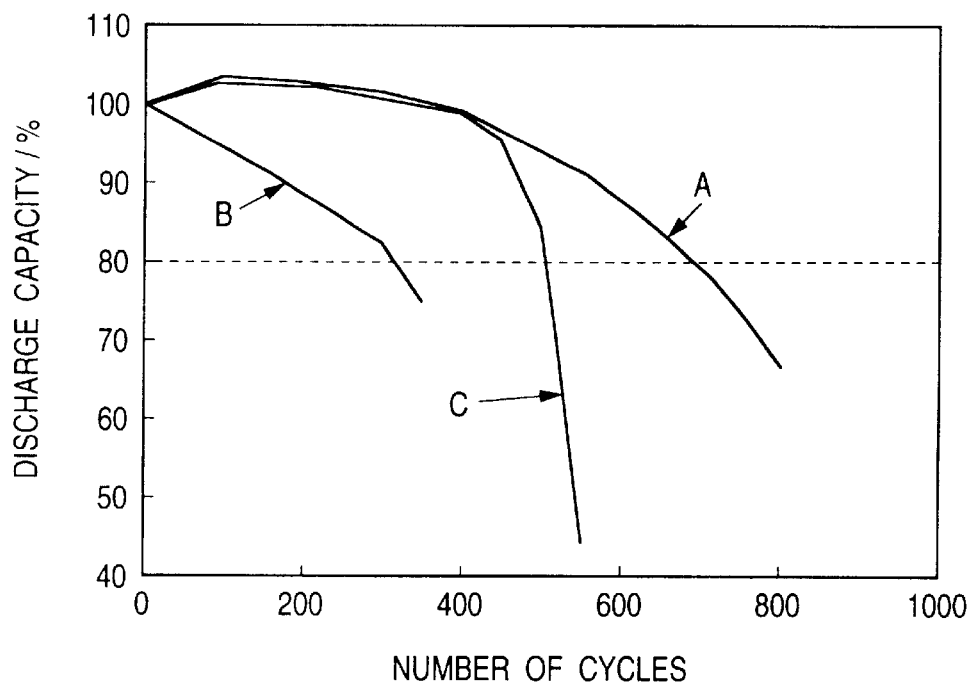
FIG. 4 is a characteristic graph showing the change in capacity during the cycle endurance test.
Figure 5:
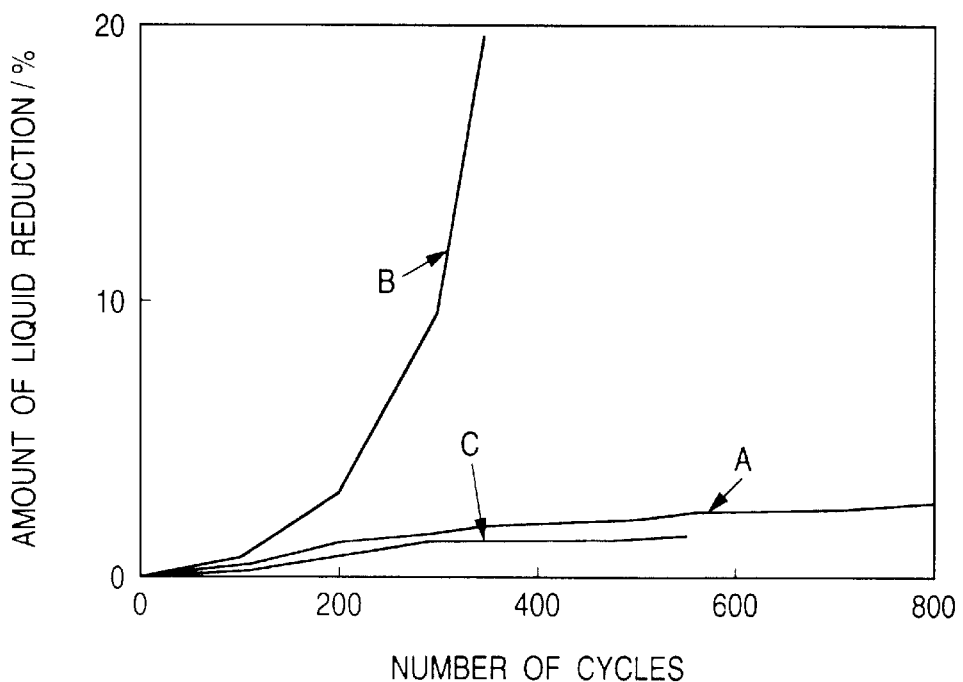
FIG. 5 is a characteristic graph showing the amount of liquid reduction during the cycle endurance test.

A lead-calcium alloy was used for the negative electrode grid. The battery A was manufactured by mixing commercial lignin into each fine glass fiber separator as electrolyte retainer, so that 0.05 g of lignin was contained per 1 cm$^3$ between the positive and negative electrodes of the battery. For the sake of comparison, also a conventional battery (B) containing no lignin between the positive and negative electrodes was prepared. In addition, a battery (C) using a lead-calcium alloy in a positive electrode grid was also prepared for comparison. With these batteries, an endurance test of JISD-5301 was performed, and the change of discharge capacity and the amount of liquid reduction were examined. The results are shown in FIG. 4 and FIG. 5. The discharge capacity is compared with the capacity before the test which is regarded as 100%. The amount of liquid reduction is shown in percents by weight, where the amount before the test is regarded as 0%.

The battery B had the shortest endurance, and the amount of liquid reduction was also much. This was because antimony eluted from the positive electrode grid precipitated on the negative plate, so that water decomposition was increased, and the amount of electrolyte was reduced. In the battery C, the endurance was shorter than that of the battery A though the amount of liquid reduction was less. The short endurance was caused by the fact that the active materials in the positive electrode were easy to deteriorate because antimony was not contained, and that the lead-calcium alloy was softer than the lead-antimony alloy so that the grid extended to cause a shortcircuit. On the contrary, in the battery A as a product according to the present invention in which a lead-antimony alloy was used for the positive electrode grid, and a separator containing lignin was used, the obtained result was that the endurance cycle number was longest, and the amount of the liquid reduction was very small. This is because the deterioration of the active materials in the positive electrode as well as the extension of the grid were less, and the lignin contained in the separator delayed the movement of the antimony from the positive electrode to the negative electrode to thereby reduce the amount of liquid reduction. However, even in the battery A, the antimony precipitated on the negative plate in the last stage of its endurance, so that water decomposition was increased to reduce the amount of electrolyte to thereby cause a factor of the mortality.

Therefore, the following experiment was made to improve the performance of the lignin for capturing antimony.

Example 2

After commercial lignin (average particle size according to SEM observation was about 50 μm, and BET specific surface was 0.5 m$^2$/g) was dissolved in sodium hydrate water-solution of pH about 10, the lignin was precipitated again by neutralization with a dilute sulfuric acid. By drying this, obtained was lignin powder in which the average particle size according to SEM observation was about 10 μm, and the BET specific surface was 2.5 m$^2$/g. This powder was mixed into a fine glass fiber separator of an electrolyte retainer, so that 0.05 g of lignin was contained per 1 cm$^3$ between the positive and negative electrodes of a battery. The battery D was prepared thus. In addition, commercial lignin (average particle size according to SEM observation was about 50 μm, and BET specific surface was 0.5 m$^2$/g) was dissolved in a sodium hydrate water-solution of pH about 10, and granular silica power was added thereto. After that, the solution was neutralized with a dilute sulfuric acid, and the lignin was carried by silica to thereby obtain lignin carrying silica power of BET specific surface of 100 cm$^2$/g. This powder was mixed into a fine glass fiber separator of an electrolyte retainer, so that 0.05 g of lignin was contained per 1 cm$^3$ between the positive and negative electrodes of a battery. The battery E was prepared thus.

TABLE 2

| Battery | grid alloy | form of contained lignin | remarks |
|---|---|---|---|
| D | 1.7% Sb alloy | average particle size 10 μm | FIG. 1B |
| E | 1.7% Sb alloy | carried by silica | " |

Figure 6:
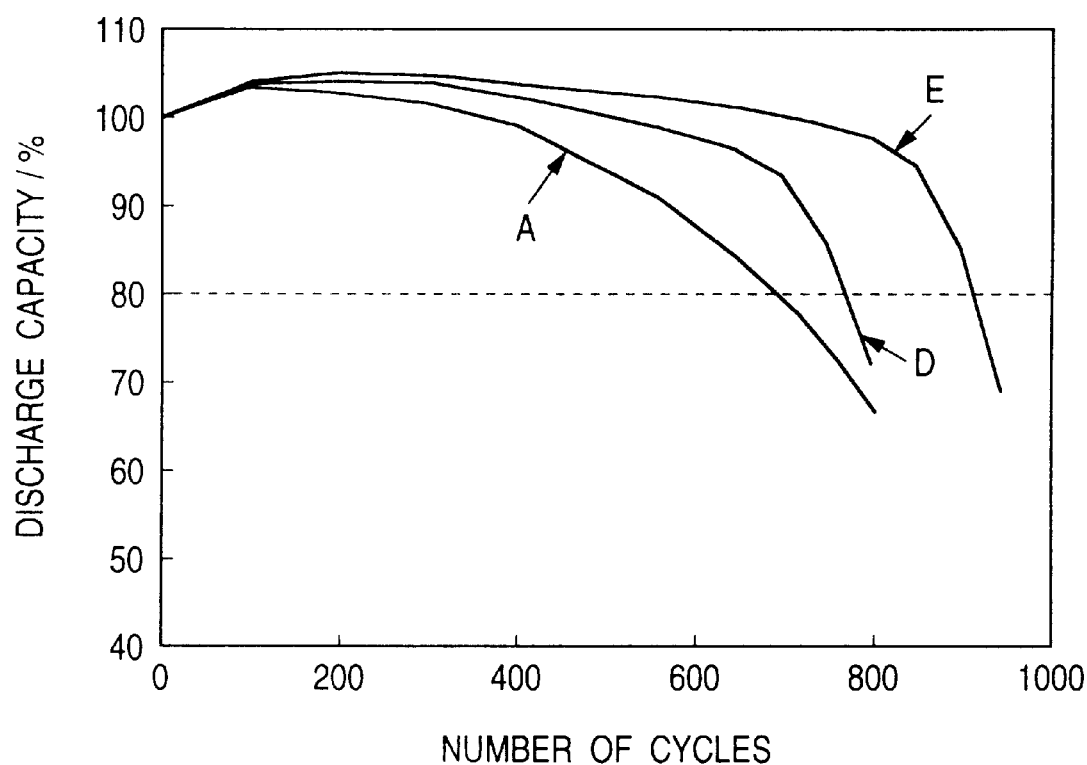
FIG. 6 is a characteristic graph showing the change in capacity during the cycle endurance test.

Tests similar to those in Example 1 were made upon there batteries to examine the change in discharge capacity. The results are shown in FIG. 6.

It was found that it took longer time for antimony to move to the negative electrode in the batteries D and E than in the battery A. The reason is considered that the effective specific surface capable of capturing antimony was increased by reducing the average particle size or having lignin carried by a carrier having a wide surface area to increase the amount of captured antimony.

However, even in the batteries D and E, corrosion of a positive electrode grid and accumulation of lead sulfate in negative electrode active materials were observed in the batteries after the endurance test. It is considered that this was caused because a lignin-mixed separator was in contact with the positive and negative plates directly. Therefore, the following experiment was made to prevent such deterioration and make the endurance longer.

Example 3

Similar tests to those in Example 1 were performed in batteries having one, two and three separator layers as shown in FIGS. 1 to 3, while changing the position of a separator layer to which lignin was added, or changing the content of the lignin, as shown in Table 3.

TABLE 3

| Battery | kind of grid alloy | amount of Sb (ppm) | number of separator layers | layer to which lignin was added | remarks |
|---|---|---|---|---|---|
| F | Ca alloy | 0 | 3 | not contact | FIG. 3 |
| G | Ca alloy | 20 | 3 | " | FIG. 3 |
| H | Ca alloy | 50 | 3 | " | FIG. 3 |
| I | 1.2% Sb alloy | 5,400 | 3 | " | FIG. 3 |
| J | 1.7% Sb alloy | 8,000 | 3 | " | FIG. 3 |
| K | 2.0% Sb alloy | 8,900 | 3 | " | FIG. 3 |
| L | 1.7% Sb alloy | 8,000 | 1 | whole | |

TABLE 3-continued

| Battery | kind of grid alloy | amount of Sb (ppm) | number of separator layers | layer to which lignin was added | remarks |
|---|---|---|---|---|---|
| M | 1.7% Sb alloy | 8,000 | 2 | positive plate | |
| N | 1.7% Sb alloy | 8,000 | 2 | negative plate | FIG. 2 |
| O | 1.7% Sb alloy | 8,000 | 3 | positive plate | |
| P | 1.7% Sb alloy | 8,000 | 3 | not contact | FIG. 3 |
| Q | 1.7% Sb alloy | 8,000 | 3 | negative plate | |

Figure 7:
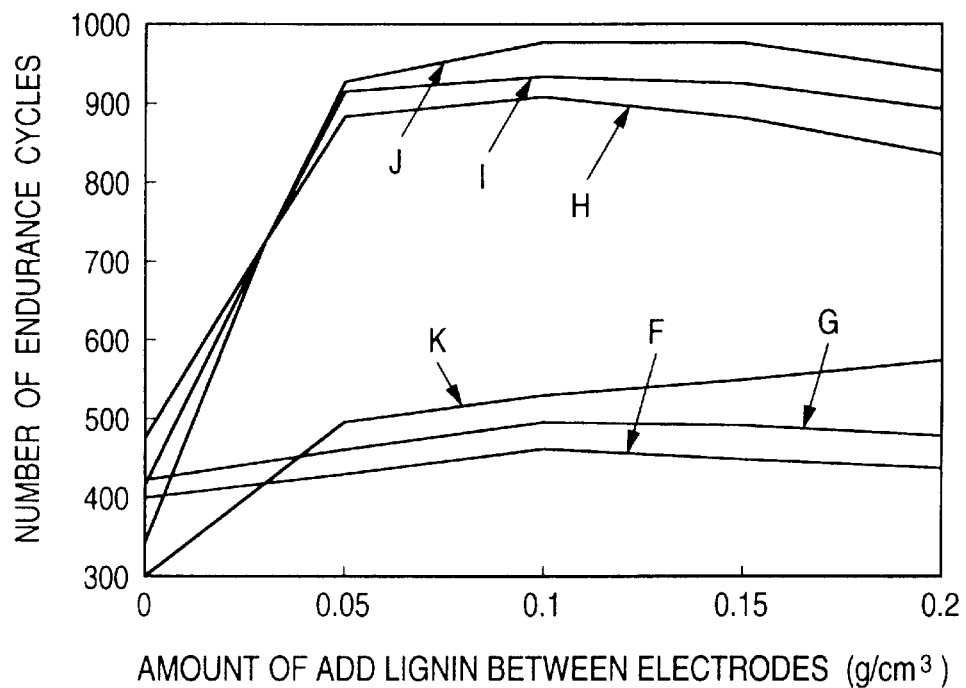
FIG. 7 is a characteristic graph showing the number of cycles till the capacity is reduced to 80% of its original during the cycle endurance test.
Figure 8:
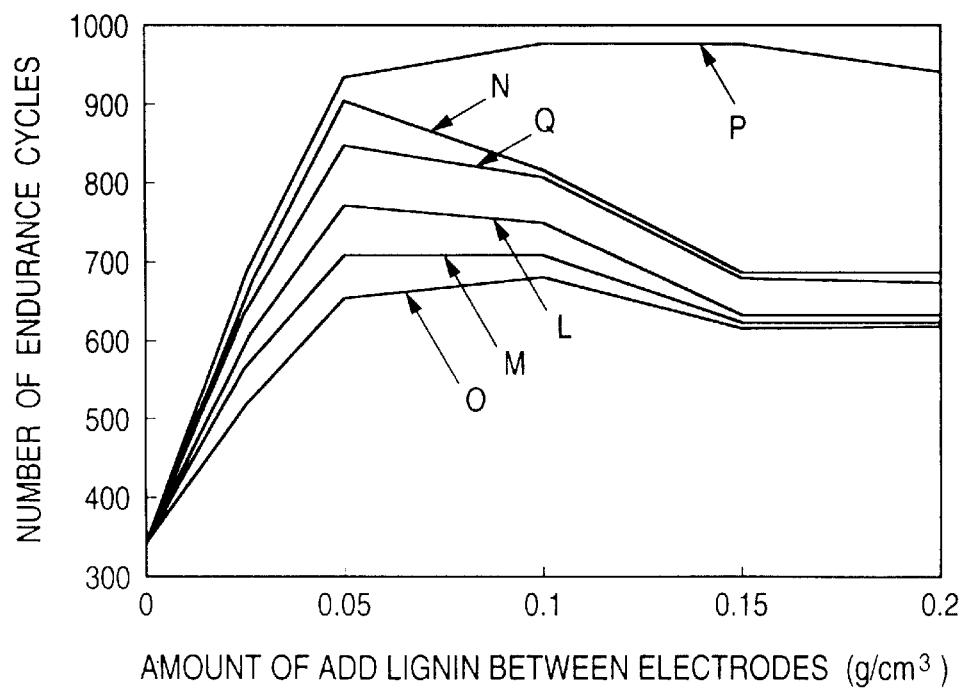
FIG. 8 is a characteristic graph showing the number of cycles till the capacity is reduced to 80% of its original during the cycle endurance test.

The number of charge/discharge cycles till the capacity was reduced to 80% of its original was examined. In batteries G and H, antimony was added to the positive electrode active materials to be 20 ppm and 50 ppm relative to the electrode plate weight respectively. In the other batteries, antimony was added into the grid alloy to be contained at the ratios shown in Table 3 respectively. Lignin prepared by the method of Example 2 and having average particle size of about 10 μm was used at the lignin to be added to a separator. The results are shown in FIG. 7 and FIG. 8. Since the endurance of a positive electrode was short when the antimony content in a positive plate was less than 50 ppm (batteries F and G), the batteries deteriorated in early stages regardless of the amount of lignin contained between the positive and negative electrodes. When the antimony content in a positive plate was more than 8,000 ppm (battery K), or when the antimony content in a positive plate was not less than 50 ppm and not more than 8,000 ppm and lignin was not contained between the positive and negative electrodes (battery of the content O), antimony eluted from a positive electrode grid precipitated on a negative plate to increase water decomposition to thereby reduce the amount of electrolyte, so that the batteries were dead in early stages.

In addition, when the content of lignin was made equal, and a separator layer to which lignin was added was changed, the endurance of a battery P in which lignin was added to a separator layer which was not in contact with both the positive and negative electrodes was longest. On the other hand, these batteries were examined before and after their dead cycle. As a result, in batteries L, M and O, corrosion of a positive electrode grid after their endurance was remarkable, and this caused their death. In batteries N and Q, the amount of lead sulfate was comparatively large still before the endurance test, and their death was caused by the lack of capacity of a negative electrode. It was found that there was a serious bad influence of lignin when a separator layer to which a larger amount of lignin was added was in contact with a positive electrode or a negative electrode.

From the results of the above experiment, it was found that the endurance performance of a battery in which lignin was added to a separator layer containing antimony of not less than 50 ppm and not more than 8,000 ppm and not contacting with a positive electrode was particularly superior to any other batteries.

As is apparent from the above-mentioned examples, in a valve-regulated lead acid battery according to the present invention, the defects in a conventional valve-regulated lead acid battery can be overcome by a method in which antimony is contained in a positive plate, and a separator between positive and negative plates is made to have a multi-layer structure of two or more layers to which lignin is contained. A very great industrial value can be recognized therein.

What is claimed is:

1. A retainer-type valve-regulated lead acid battery comprising a positive plate containing antimony, a negative plate and a glass mat separator containing lignin and fine glass fiber, wherein an active material of the positive plate contains antimony in an amount of from 50 to 8,000 ppm and/or wherein the positive plate comprises a positive grid lead alloy containing antimony in an amount of from 0.5 to 1.7 weight %.

2. The valve-regulated lead acid battery as claimed in claim 1, wherein said glass mat is a separator having a multi-layer structure of not less than two layers, and at least one of the glass mat separator layers not directly in contact with both or either of the positive plate and the negative plate contains lignin.

3. The valve-regulated lead acid battery as claimed in claim 1, wherein the positive plate contains antimony in an amount of from 50 to 8,000 ppm.

4. The valve-regulated lead acid battery as claimed in claim 1, wherein the positive plate comprises a positive grid lead alloy containing antimony in an amount of from 0.5 to 1.7 weight %.

5. The valve-regulated lead acid battery as claimed in claim 1, wherein the lignin has a particle size of not larger than 10 μm.

6. The valve-regulated lead acid battery as claimed in claim 1, wherein the lignin has a BET specific surface area of not smaller than 2.5 m$^2$/g.

7. The retainer-type valve-regulated lead acid battery as claimed in claim 1, wherein said glass mat separator containing lignin and fine glass fiber inhibits transfer of antimony from the positive plate to the negative plate.

8. A valve-regulated lead acid battery comprising a positive plate containing antimony, a negative plate, and a separator containing granular silica containing lignin, wherein an active material of the positive plate contains antimony in an amount of from 50 to 8,000 ppm and/or wherein the positive plate comprises a positive grid lead alloy containing antimony in an amount of from 0.5 to 1.7 weight %.

9. The valve-regulated lead acid battery as claimed in claim 8, wherein said separator is a glass mat separator having a multi-layer structure of not less than two layers, and at least one of the glass mat separator layers not directly in contact with both or either of the positive plate and the negative plate contains lignin.

10. The valve-regulated lead acid battery as claimed in claim 8, wherein the positive plate contains antimony in an amount of from 50 to 8,000 ppm.

11. The valve-regulated lead acid battery as claimed in claim 8, wherein the positive plate comprises a positive grid lead alloy containing antimony in an amount of from 0.5 to 1.7 weight %.

12. The valve-regulated lead acid battery as claimed in claim 8, wherein the lignin has a particle size of not larger than 10 μm.

13. The valve-regulated lead acid battery as claimed in claim 8, wherein the lignin has a BET specific surface area of not smaller than 2.5 m$^2$/g.

14. The valve-regulated lead acid battery as claimed in claim 8, wherein said granular silica containing lignin inhibits transfer of antimony from the positive plate to the negative plate.

\* \* \* \* \*